Aug. 31, 1965  R. G. JOHANSSON  3,203,669
CLIMBING JACK

Filed May 14, 1962  10 Sheets-Sheet 1

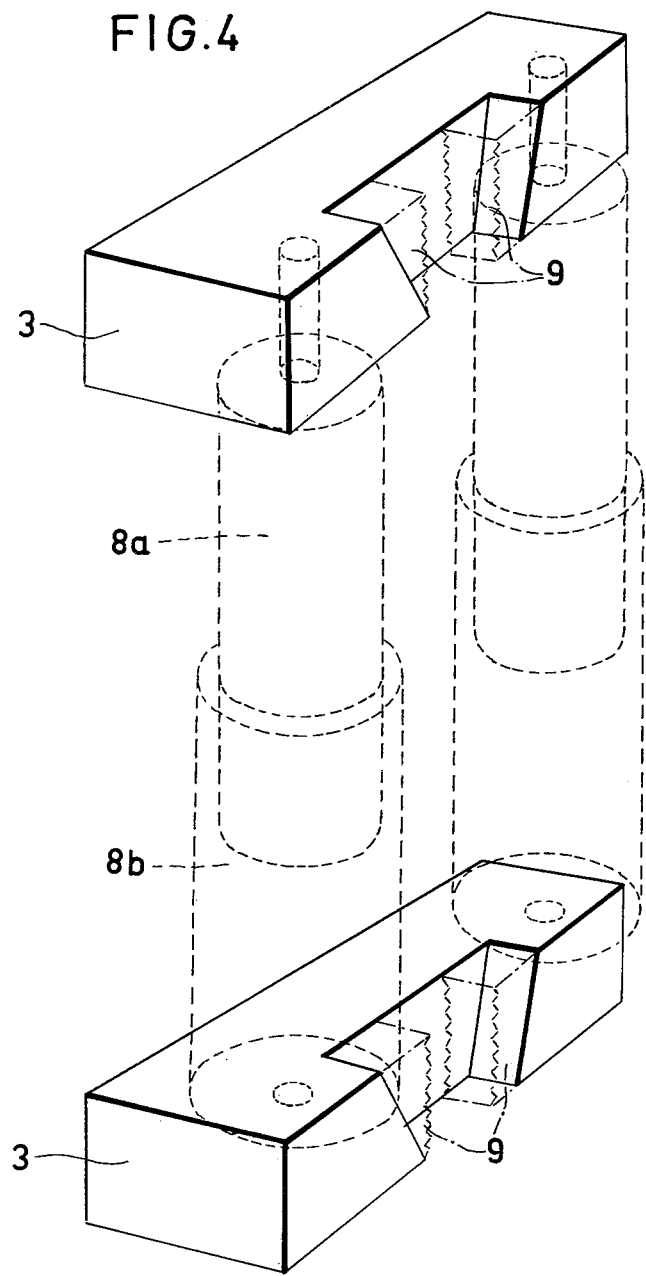

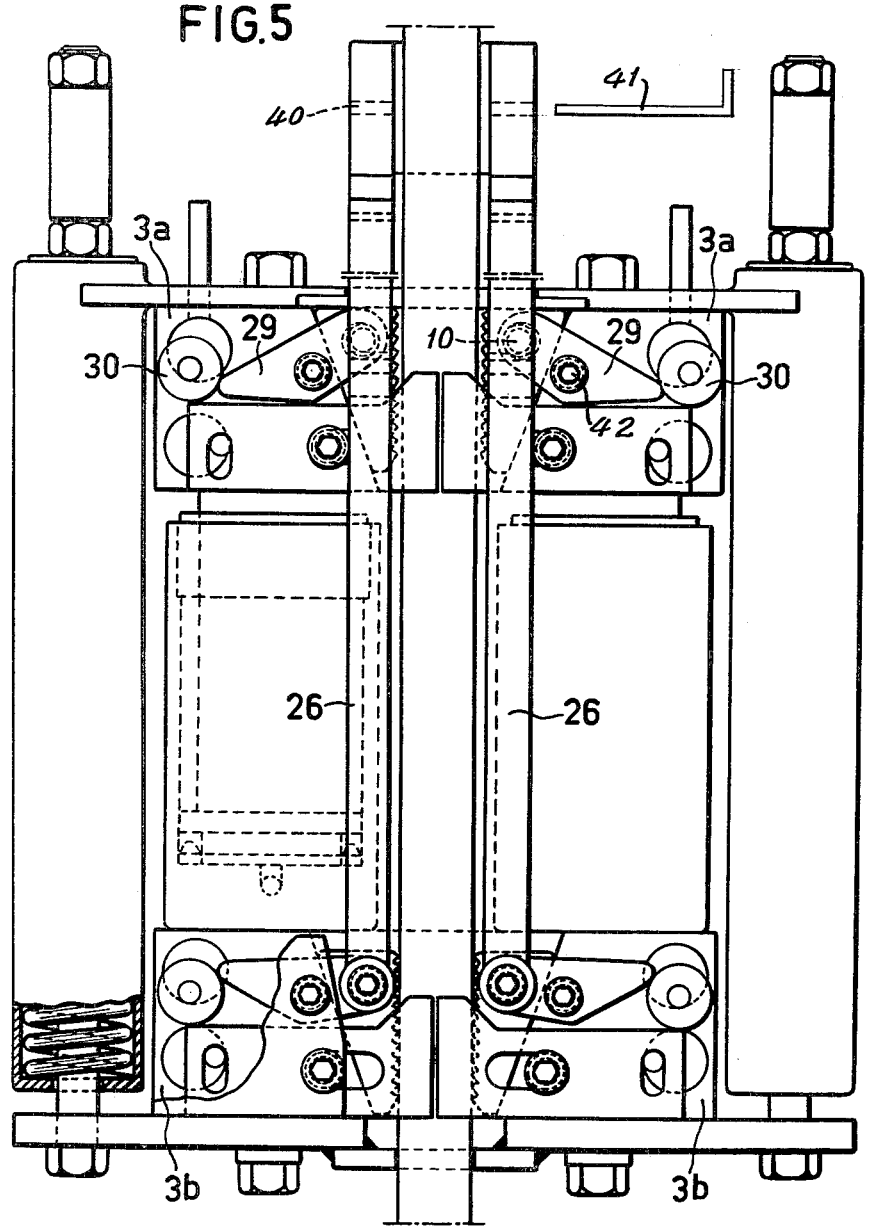

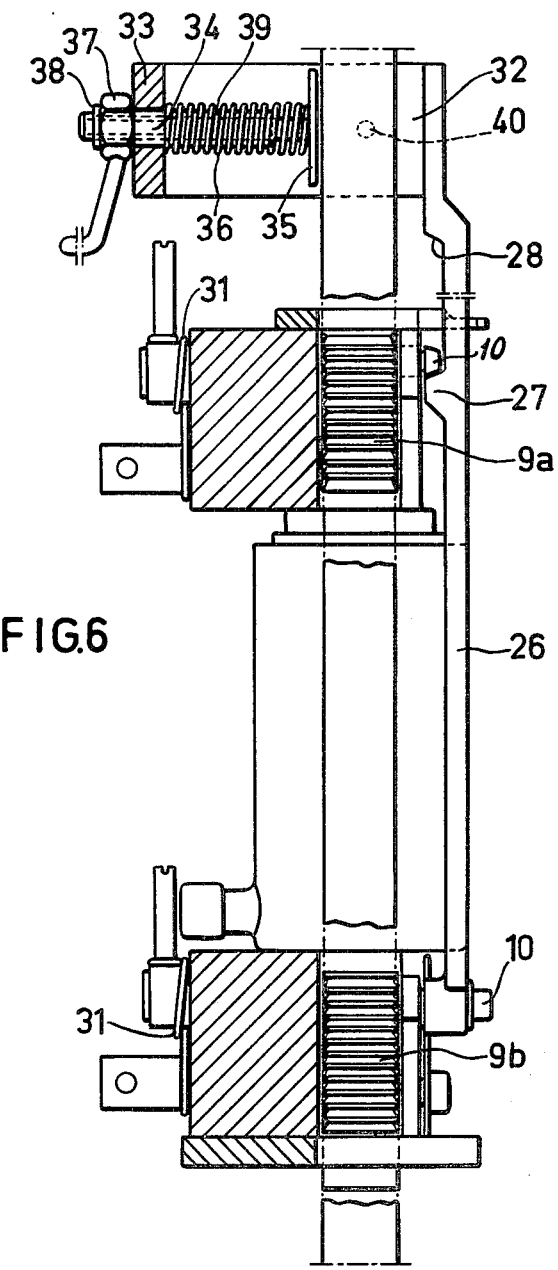

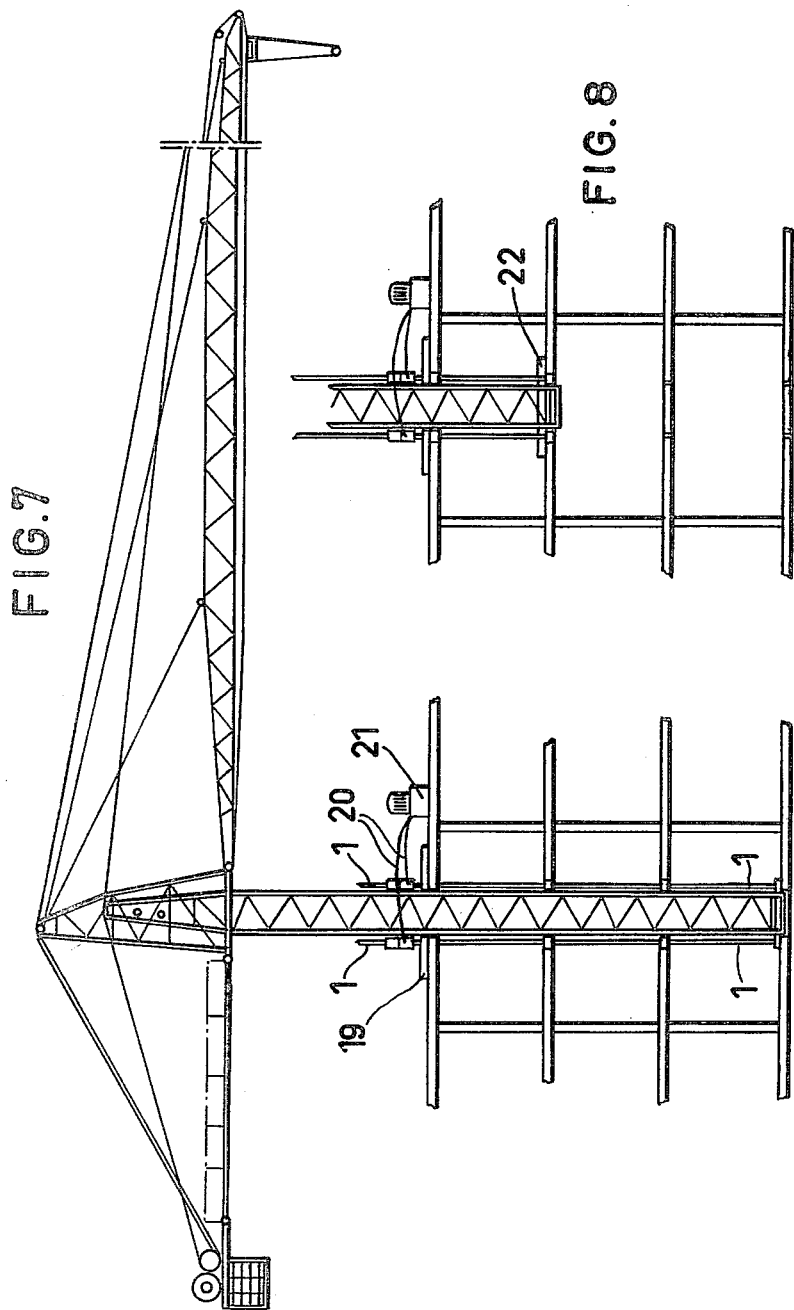

Aug. 31, 1965  R. G. JOHANSSON  3,203,669
CLIMBING JACK
Filed May 14, 1962  10 Sheets-Sheet 8
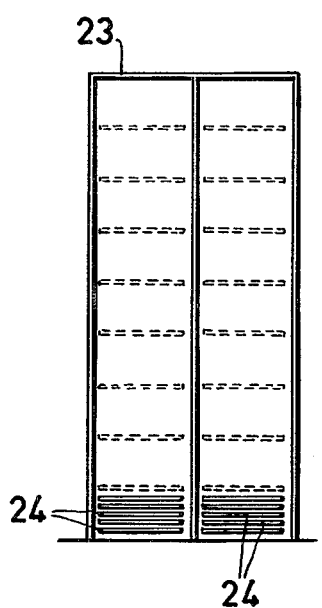
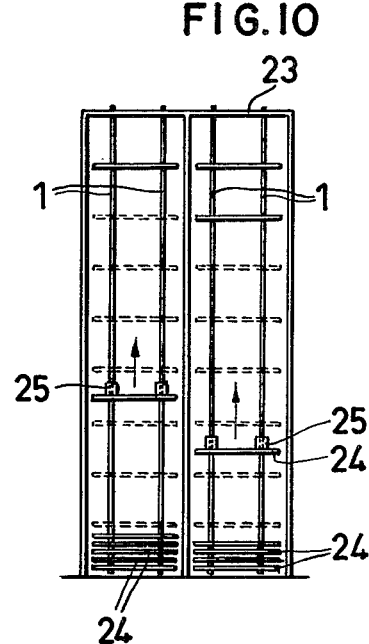

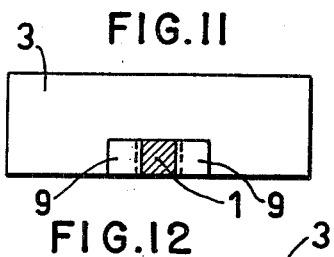
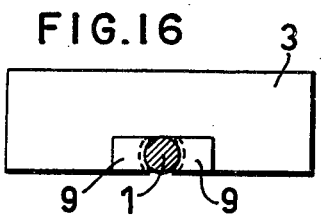
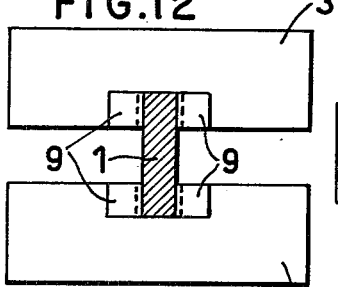
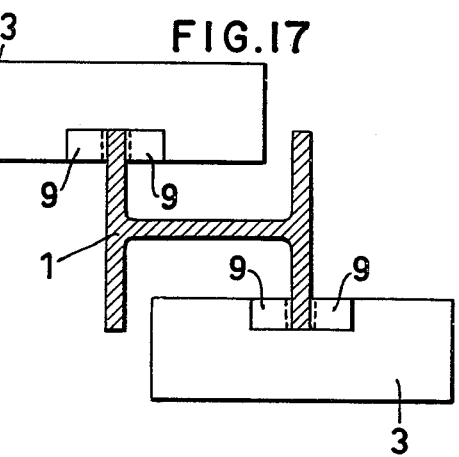
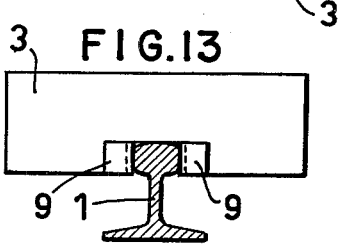
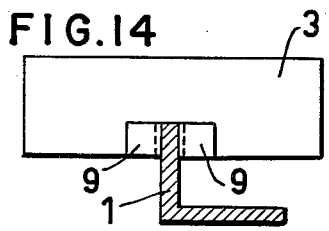
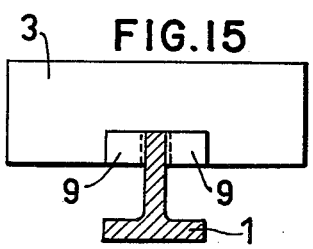
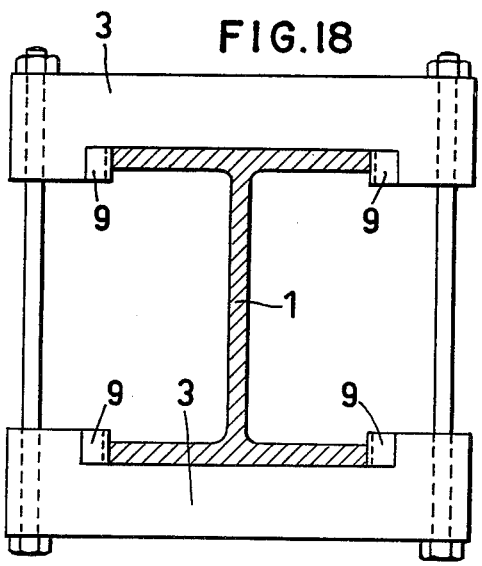

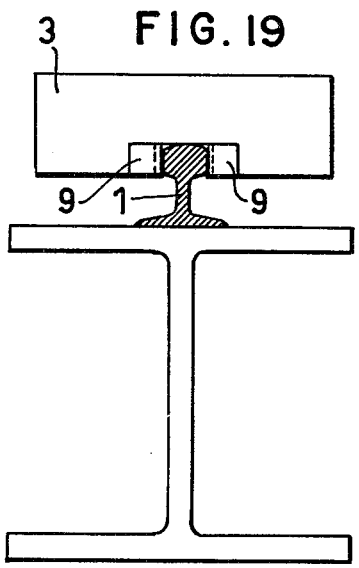
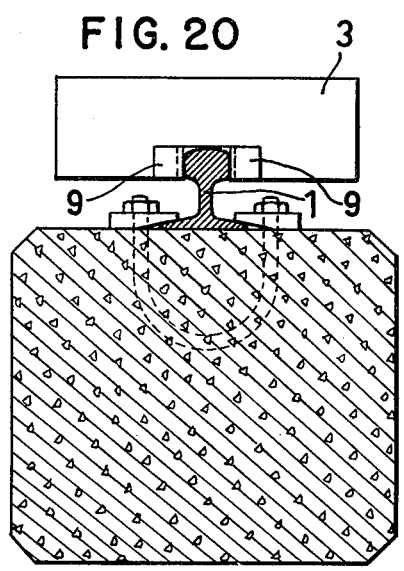
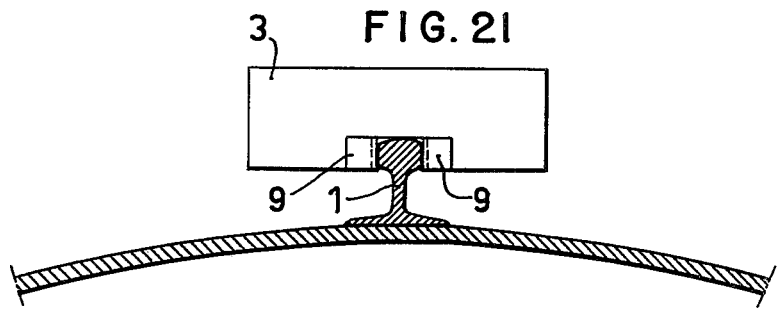

United States Patent Office 3,203,669
Patented Aug. 31, 1965

3,203,669
CLIMBING JACK
Rolf Gustaf Johansson, Saltsjo-Duvnas, Sweden, assignor to AB Byggförbättring, a company of Sweden
Filed May 14, 1962, Ser. No. 194,631
Claims priority, application Sweden, May 17, 1961, 5,189/61
5 Claims. (Cl. 254—107)

The lifting or lowering of heavy loads for example of the magnitude of 100 tons and more constitutes a working operation which, particularly when it is a nonrecurrent operation, creates problems requiring solutions of a complicated and expensive character in relation to the work performed.

It is the object of this invention to produce a means for solving said problems in cases where conventional lifting means are not suitable or cause too high mounting costs, further in such cases where fixed or mobile cranes cannot be employed in view of their insufficient lifting capacity or considerable space requirement and, finally, when the object in view of its inherent stability requires a spreading of the points of engagement of the lifting force.

The invention relates to an improved climbing jack adapted to be adjusted to a wider field of action, which climbing jack by displacement along a rod or the like lifts or lowers a load resting on the jack or secured to the rod, the climbing jack comprising at least two U-shaped gripping heads connected by jacks and spring means and adapted to be displaced to and from each other, wherein gripping clamps for alternate engagement with the rod are arranged, to produce a relative movement between the rod and the climbing jack, characterized in that the gripping clamps 9 are arranged on the inside of the U-legs in each gripping head 3 and adapted to be displaced towards one another for clamping the rod 1 between themselves, thus rendering the climbing jack possible to be mounted from the side on a rod 1 or the like.

Climbing jacks of the aforesaid type are previously known substantially in connection with slipform casting. Climbing jacks according to the invention differ from the said known jacks substantially in that they can climb on a rod in both directions, i.e. normally upwards and downwards, and that they can be mounted on the rod from the side.

The latter distinguishing feature includes the advantage that the climbing jack is not restricted for use in connection with rods of a small diameter but, in contrast to all previously known types of climbing jacks may be employed in connection with any section shape, possibly by exchanging the gripping clamps or simply by mounting to the side of an object of larger dimensions a section suitable for the climbing jack.

The climbing jack according to the invention is further constructed such, that all movable parts and such subjected to wear can be exchanged individually while the jack continues carrying the load. This characterizing feature is of considerable importance from a safety point of view.

The invention will be described in greater detail in the following by way of examples, reference being had to the accompanying drawings wherein—

FIG. 4 shows in a schematic manner a perspective projection of details comprised in the climbing jack, FIG. 5 shows a front view similar to that in FIG. 1 of another embodiment of the invention, with automatic climbing, FIG. 6 shows a side view, partially in section, similar to that in FIG. 5 of the said second embodiment.

FIG. 7 is an elevational view, partly broken away, illustrating climbing jacks employed with a construction crane, FIG. 8 is an elevational view partly broken away of the arrangement shown in FIG. 7 illustrating the special floor slab, FIG. 9 is an elevational view of a building structure erected by slip form casting, FIG. 10 is an elevational view showing the climbing jacks used for elevating floor slabs in the structure illustrated in FIG. 9, FIGS. 11–18 respectively illustrate the manner in which the gripping clamps of the climbing jack may grip about different sections, and FIGS. 19–21 respectively show how the climbing jack may be used for lifting objects of considerable size.

Figure 1:
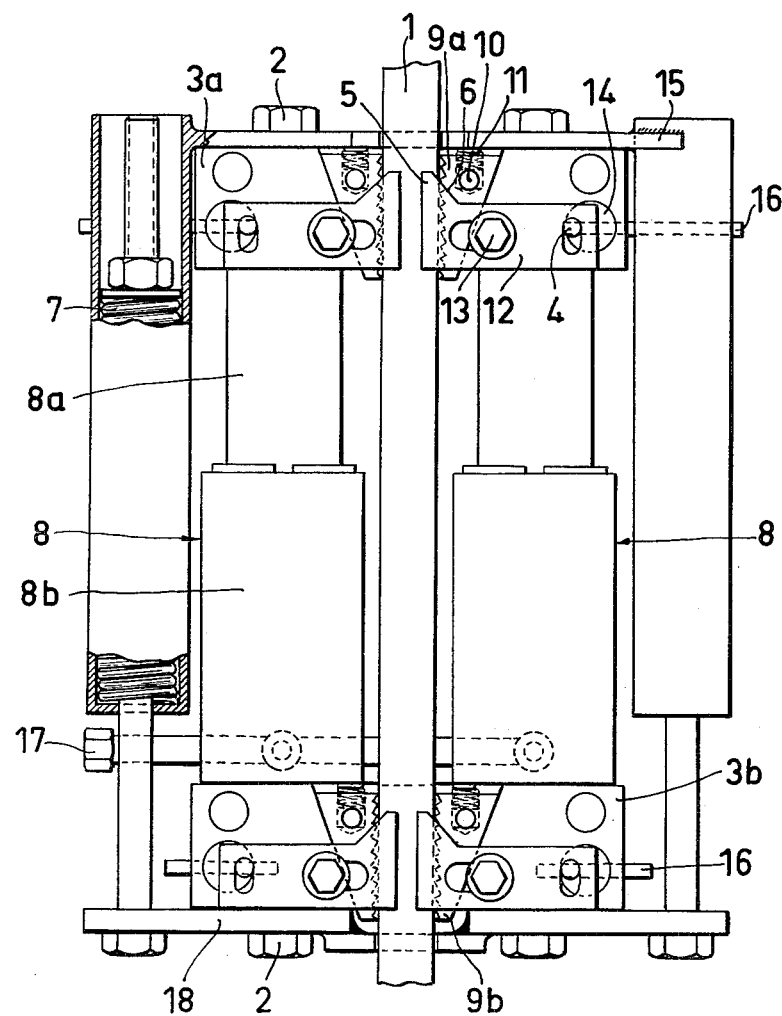
FIG. 1 shows a front view, partially in section, of the climbing jack according to the invention.
Figure 2:
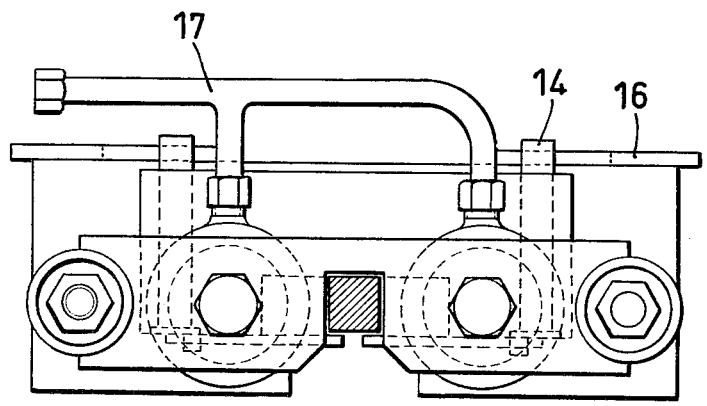
FIG. 2 shows a horizontal view of the same climbing jack.
Figure 3:
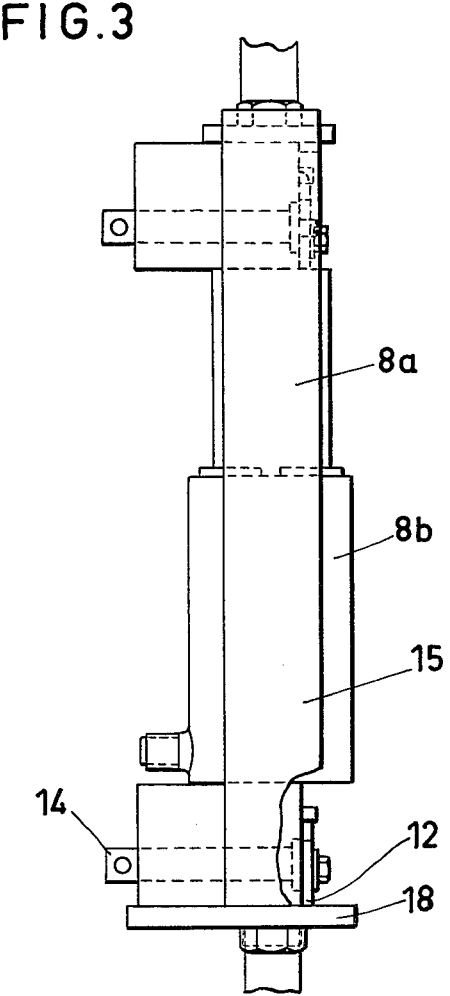
FIG. 3 shows a side view of the same climbing jack.

The relationship of motion between the climbing jack and the climbing rod is of a relative nature, in that either the jack may be mounted in a fixed position and the rod be displaced upwards or downwards with the load attached thereon, or the rod may be secured in a fixed position and the jack with the load be caused to climb upwards or downwards. The climbing jack according to FIGS. 1–3 is arranged to operate with a hydraulic pressure medium. The climbing jack comprises two substantially U-shaped gripping heads 3, which are stiff against torsion, each carrying its pair of wedge-shaped gripping clamps 9 to be wedged in between the climbing rod 1 and the gripping heads with the help of compression springs 11, the said heads having sliding surfaces in inclined arrangement with the rod. The surfaces of the gripping clamps 9 engaging the climbing rod 1 are toothed or arranged in another manner to increase the friction, so that the gripping clamps when they are in firm engagement with the rod cannot slip along the same.

The gripping clamps 9 are brought into engagement with the rod 1 by means of gripping clamp lifters 12, each in displaceable attachment to the gripping heads 3 by a screw 13 running in an oblong longitudinal hole in the gripping clamp lifter. The displacement of the gripping clamp lifter is effected by a crank journal 4 running in a transverse oblong hole in the gripping clamp lifter and mounted eccentrically on a shaft 14 adapted to be rotated by means of an operating handle 16 extending transverse through the shaft.

The gripping clamp lifters 12 are at their end facing the rod provided with a shoulder 5 with an inclined sliding surface 6 on the side facing away from the rod. The gripping clamps 9 which, as mentioned before are held in a wedged position by compression springs 11 are provided with a pin 10 adapted to slide upwards on the sliding surface 6 of the lifter shoulder 5 when the gripping clamp lifter is being moved outwards. Hereby the gripping clamp 9 is lifted and releases the engagement with rod 1.

Between the two gripping heads 3, there are two parallel jacks 8. The cylinders 8b of the jacks are secured to one of the gripping heads 3 by screws 2, and the pistons 8a are, also by screws 2, secured to the other gripping head 3. The gripping heads 3 are further connected with one another by spring means 7 holding the heads normally in compressed position. Both jacks have limited and equal stroke length, normally about 100 mm. They may be doubleacting, but are on the accompanying drawings shown singleacting and moved into end position closest to one another by means of the said spring means.

The climbing jack, when lifting the rod 1 with the load attached thereto is operated in the manner as follows.

The climbing jack is in fixed arrangement, the rod placed between the gripping clamps 9 from the side. In inoperative position, the gripping heads 3 are retained in the position closest to one another. Both pairs of gripping clamps 9 are moved into engagement with the rod whereafter the pressure medium is allowed to enter the cylinders 8b. Thereby, the gripping heads 3 are spaced off one another, i.e. as the climbing jack is in firm connection with the gripping head 3b carrying the cylinders 8b, the upper gripping head 3a is displaced upwards. Due to the fact that the gripping clamps 9 are provided with wedge-shaped surfaces for contact with the gripping heads, the gripping clamps 9a are secured by wedging between the rod 1 and the gripping head 3a, the rod being lifted when the pistons 8a are moving upwards. During this upward movement of rod 1, the lower gripping clamps 9b are caused to slide somewhat uphill their sliding surfaces on the lower gripping head 3b and thereby to disengage from the rod 1, so that the rod may slide freely between the clamps.

With the pistons 8a in their uppermost position, the pressure in the cylinders decreases somewhat, causing thereby the upper gripping head 3a to be lowered somewhat, whereby the lower gripping clamps 9b immediately engage with the rod 1 and prevent it from lowering. The rod 1 with its load is now maintained in safe engagement with the lower gripping clamps 9b. The pressure in the cylinders may be let off entirely, so that the upper gripping head 3a by the compression spring means 7 is caused to approach the lower gripping head 3b while at the same time the pistons 8a are pressed into the cylinders 8b. Thereafter a new lifting operation may be commenced.

When lowering the rod 1 with attached load, the operation is as follows. With the rod in safe engagement in the lower gripping clamps 9b, the upper gripping clamps 9a are moved away from the rod with the help of the gripping clamp lifters 12. Thereafter the upper gripping head 3a is pressed upwards to a position about 10 mm. from its uppermost position, in which position the upper gripping clamps 9a are moved back into engagement with the rod with the help of the gripping clamp lifters 12, whereafter the upper gripping head 3a is pressed upwards for the remaining 10 mm. distance to its uppermost position, during which final step of the upward movement the upper gripping clamps 9a grip and retain the rod 1. Thereafter, the lower gripping clamps 9b are moved out of their engagement with rod, and the pressure in the jacks is decreased, so that the pistons and thereby the upper gripping clamps 9a with the rod 1 are lowered to a position about 10 mm. above the lowermost position. In this position, the lower gripping clamps 9b are again moved into engagement with the rod, and the rod is lowered the remaining 10 mm. so that the lower gripping clamps may safely grip around the rod. The entire cycle may now be repeated.

If instead of the rod 1 the climbing jack is desired to be displaceable, the entire unit must be turned upside down. In other words, the gripping clamps must be wedged into the opposite direction. Thereby, the assumed top angle of the inclined planes on the gripping heads will have its top upwardly. The operation is performed correspondingly as described in connection with the displacement of the rod.

FIGS. 5 and 6 show another embodiment of the climbing jack according to the invention, the climbing occurring automatically. A climbing jack according to this embodiment is particularly expedient when the climbing and specially the downward climbing has to cover longer distances.

The climbing jack according to this embodiment is constructed in substantially like manner as described in the foregoing, apart from the fact that the gripping clamps have no compressiaon springs 11 and that the gripping clamp lifters 5 have a more secondary function.

The gripping clamps are moved into and out of engagement with the rod 1 by a pair of vertical reversing levers 26 articulated on the control pins 10 of the lower gripping clamps 9b and adapted, when the climbing rod is being lowered to operate alternately the lower and the upper gripping clamps 9, which operation of the upper gripping clamps occurs with the help of shoulders 27 and stoppers 28 mounted on the reversing levers about directly in front of the upper gripping clamp pins 10, the said shoulders 27 and stoppers 28 adapted for engagement with the pins and moving the gripping clamps upwards or downwards for release from or engagement with the climbing rod, the said gripping clamps adapted by means of rocker means 29 and eccentrically mounted rolls 30 to be locked in their respective end positions in that the control pins 10 engage with a certain clearance in holes in the rocker means, said means pivoted in about their centre and their extremities held pressed upwards or downwards by the eccentric rolls 30 biased by torsion springs 31.

During the upward climbing of the jack the reversing levers 26 are turned somewhat outwards into inoperative position in order not to engage the upper gripping clamp pins 10 and are held there by a pin 41 inserted through apertures 40 in a U-shaped yoke 32. The pin 41 abuts against the rod 1 and prevents the yoke and thus the reversing levers from falling back into inoperative position. When the jack is climbing downwards or a climbing rod with load is being lowered, the reversing levers must, however, be in operative position, i.e. they must be set in towards the jack for engagement with the control pins 10 of the gripping clamps.

In this embodiment, the gripping clamps operate in like manner as in the aforedescribed embodiment, the control, however, being effected automatically instead of manually.

The reversing levers are maintained in operative position by a clamp bolt means attached to the upper end of the rods, the bolt means comprising the U-shaped yoke 32 having its leg ends rigidly connected to the outside surfaces of the reversing levers and a bolt 34 extending freely through the web 33 of the yoke in a fixed bushing 39. At its end facing the climbing rod 1, the bolt is provided with a fixed contact plate 35, and at its opposite end with an axially secured stop member in the form of a washer 38. The bolt may be displaced axially by means of an adjusting screw 37 with a crank on the outside of the yoke web 33 between an inner position wherein the contact plate 35 abuts to the bushing 39. In the said inner end position of the bolt, the contact plate 35 is not pressed hard against the climbing rod 1, because the reversing levers are not biased but are in loose contact with the rod to prevent clamping of the climbing rod between the contact plate 35 and the reversing shoulders 27 of the reversing levers.

For lowering the climbing rod with load, the climbing jack according to this embodiment operates in the manner as follows. The starting position of the jack appears from FIG. 5, i.e. the upper gripping clamps 9a are out of and the lower gripping clamps 9b are in engagement with the climbing rod 1. The jack is in contracted position, i.e. the gripping heads are in the position closest to one another. By applying pressure in the cylinders, the upper gripping head 3a is moved uphill the climbing rod 1 until the control pins 10 of the gripping clamps 9a, which pins 10 are inserted in apertures in the outer ends of the rocker means 29, strike against the stoppers 28 of the reversing levers, whereby the rocker means 29 rotate their respective axes so that the inner ends of the rocker means 29 press the eccentric rolls 30 out of the way and are locked in their upper positions, i.e. are maintained pressed upwards by the rolls 30, the inner ends of the rocking means keeping the pins 10 pressed downwards, so that the gripping clamps 9a engage the climbing rod. It should be observed in this connection that the holes in the inner ends of the rocker means for the pins 10 must be provided with clearance for the pins, because these holes perform an arc-shaped swinging motion while the pins 10 move in a straight line transverse to the vertical plane.

The upper gripping head 3a continues to move a distance upwards after the stoppers 28 of the reversing levers have moved down the gripping clamp pins 10, whereby the reversing levers are lifted by the pins 10 and thereby draw the control pins 10 of the lower gripping clamps 9b upwards, so that the extremities of the lower rocker means are locked in their lower position, while at the same time the lower gripping clamps 9b are reversed to their upper end position where they are free from the climbing rod.

When thereafter the pressure in the jack cylinders is decreased, the springs 7 draw the gripping heads 3a and 3b again towards one another whereby the lower gripping clamps 9b which are free from the rod are moved upwards the rod and take the reversing levers 26 along until the reversing shoulders 27 on the levers strike against the control pins 10 of the upper gripping clamps. The said pins are locked by the load suspended on the rod, so that the reversing levers are pressed downwards until the extremities of the lower rocker means 29 are locked in their upper poistion and maintained pressed upwards by the eccentric rolls 30. At the same time, the lower gripping clamps are moved into engagement with the climbing rod and locked, whereby the shoulders 27 of the reversing levers during their continued upward movement press the control pins of the upper gripping clamps upwards, while the climbing rod rests in the lower gripping clamps. Thereby the upper gripping clamps are loosened, and the complete working cycle may be repeated.

If for one reason or another the upper gripping clamps are not loosened during the said final phase from their engagement with the climbing rod, the shoulders 27 of the reversing levers due to their conical contact surface will slide on the conical surface of the pin heads 10 whereby the reversing levers 26 are pressed outwards, so that the pins 10 and shoulders 27 may pass each other. This is possible because the clamp bolt 34 in the yoke 32 at the upper end of the reversing levers is biased by a compression spring 36 adapted to be compressed such that the reversing levers may swing outwards from their operative position. The spring means is thus a safety device arranged to prevent damage of the climbing jack or any of its parts if the situation described should occur.

The reversing levers 26 are during the upward climbing of the jack secured in their outwardly swung inoperative position by means of a locking pin extending through holes 40 in the legs of the yoke 32.

FIG. 7 shows an example of the employment of climbing jacks according to the invention for lifting a stationary construction crane several stories. The construction crane is provided with climbing rods 1 for permanent or temporary use, and the climbing jacks are in this example mounted on a suitable support 19 on the uppermost floor level. The climbing jacks, in this example of the hydraulic type, are connected to an oil pump 21 by lines 20. The construction crane is first lifted somewhat above the desired level and lowered thereafter on a special floor slab 22 (FIG. 8) whereafter the climbing jacks can be removed from the side from their climbing rods and employed for other purposes. From this example appears the considerable advantage of the climbing jacks according to the invention with particular clearness. They are easy to mount, require little space, have great lifting capacity and are after use easy to remove. Furthermore, from a workers' protection point of view, they are extremely safe to work with.

FIG. 9 shows another example of the applicability of climbing jacks according to the invention. In this example, floors are to be lifted to different stories in a building under construction. A building structure is erected by slipform casting to its full height, the uppermost floor 23 being cast ready on the working platform of the slipform. The remaining floors 24 in the building are precast one upon the other and stacked on the lowest level (ground plane). In the ready cast uppermost floor suspending climbing rods 1 are secured (FIG. 10). Climbing jacks 25 are attached to the rods 1 and secured to the floors 24 and the floors are thereafter lifted one by one to their respective level where they are secured by casting. Even this example shows the value of climbing jacks according to the invention with respect to rationalization of the building industry.

The previously known climbing jacks surrounding the climbing rods entirely are very troublesome if not impossible to use in cases as they are described here, because they cannot be lowered when loaded.

FIGS. 11–18 respectively show different examples of sections of climbing rods adapted for use in connection with climbing jacks according to the invention. Previously it was only possible to use square or round sections.

FIGS. 19–21 illustrate how different sections may be attached by welding or in another manner to objects of very great dimensions to be lifted or lowered by climbing jacks according to the invention.

As examples of fields of application may be mentioned: Placing of heavy details, for example cast floors or the like in a building under construction.

Lifting of assembled constructional units which otherwise must be transported in smaller units at considerably higher costs to the place in question and assembled there. For example roof constructions, cranes or the like.

Successive lifting of prefabricated constructional elements to be jointed from below. For example, in connection with erections of cisterns.

Lifting of a sunk ship.

Lifting of an entirely or partially completed bridge deck into final position.

The climbing jack is, of course, not limited to the embodiments described and shown, but may be modified within the scope of the invention and of the following claims.

What I claim is:

1. In an assemblage for raising and lowering a load, jack means including at least two gripping heads arranged in spaced substantially parallel relationship, springs interconnecting said gripping heads and normally urging said heads toward each other, cylinders and pistons located between said heads, the cylinders being connected to one head and the pistons to the other head, each gripping head having an open ended slot extending heightwise thereof with said slots being in alignment, rod means adapted to be positioned in said slots, each slot having upwardly and outwardly inclined walls, a pair of gripping clamps for each head arranged in the slots, each clamp having a surface complementary to said inclined wall and a surface for engagement with the rod means so that downward movement of said clamps effects engagement with the rod means and upward movement effects disengagement with the rod means, the load being adapted to be supported on one of said means, and means operably connected with each gripping clamp for displacing each clamp for effecting engagement and disengagement with the rod means whereby the jack means may be mounted on the rod means from the side through said open ended slots.

2. The assemblage as claimed in claim 1, including a clamp lifter for each gripping clamp, means connecting each clamp lifter to the gripping heads for movement into and out of engagement with the rod means, and control means coupled to said lifters for moving the same.

3. In an assemblage for raising and lowering a load, jack means including upper and lower gripping heads arranged in spaced substantially parallel relationship, springs interconnecting said gripping heads and normally urging said heads toward each other, cylinders and pistons located between said heads, the cylinders being connected to one head and the pistons to the other head, each gripping head having an open ended slot extending heightwise thereof with said slots being in alignment, rod means adapted to be positioned in said slots, each slot having upwardly and outwardly inclined walls, a pair of gripping clamps for each head arranged in the slots, each clamp having a surface complementary to said inclined wall and a surface for engagement with the rod means so that downward movement of said clamps effects engagement with the rod means and upward movement effects disengagement with the rod means, the load being adapted to be supported on one of said means, a control pin for each gripping clamp for the lower head, a pair of vertical reversing levers, means articulating each lever to a control pin, a control pin for each gripping clamp for the upper head, spaced apart shoulders on each reversing lever engageable with the control pins of the clamps for the upper head, rocker means for each gripping clamp, said rocker means having inner and outer ends, means pivotally mounting said rocker means for movement about their centers, said rocking means having apertures adjacent their inner ends in which said control pins are loosely engaged, eccentrically mounted rolls cooperable with the outer ends of said rocker means, and torsion springs biasing said rolls, the arrangement being such that said clamps are moved into and out of engagement with the rod means by said reversing levers and during lowering of the rod means operate automatically the lower and upper clamps alternately by said shoulders engaging said control pins and moving said clamps upwardly or downwardly for release from and engagement with said rod means with said clamps being locked in their respective end positions by the control pins engaging loosely the apertures at the inner ends of the rocker means and said rocker means being held downwardly or upwardly by said spring biased rolls.

4. The assemblage as claimed in claim 3, wherein during lowering of the rod means said reversing levers are moved toward the rod means while during raising of the rod means said levers are moved away from the rod means, and means maintaining said levers toward the rod means, such means comprising a U-shaped yoke attached to the upper ends of the levers, a bolt passing freely through the web of the yoke, a contact plate at the end of the bolt facing the rod means, and a crank operated adjusting screw at the other end of the bolt.

5. The assemblage as claimed in claim 4, including compression spring means for biasing said bolt for providing means preventing unintentional release of said clamps and said control pins for said upper clamps having conical heads and said shoulders having bevelled surfaces.

References Cited by the Examiner

UNITED STATES PATENTS

| 103,899 | 6/70 | Lewis | 61—46.5 |
| 1,120,741 | 12/14 | Petrie | 254—106 X |
| 2,352,370 | 6/44 | Carruthers | 61—46.5 |
| 2,944,403 | 7/60 | Smith | 254—106 |

FOREIGN PATENTS 1,237,502   6/60   France.

WILLIAM FELDMAN, *Primary Examiner.*

HARRISON R. MOSELEY, M. HENSON WOOD, JR.,
*Examiners.*